Jan. 31, 1956

A. K. TATEISHI 2,732,724

PHONOGRAPH WITH RESILIENT MOUNT FOR
TURNTABLE DRIVING ELECTRIC MOTOR

Filed Oct. 18, 1952

Inventor:
Arthur K. Tateishi
By:- Fred Gerlach atty.

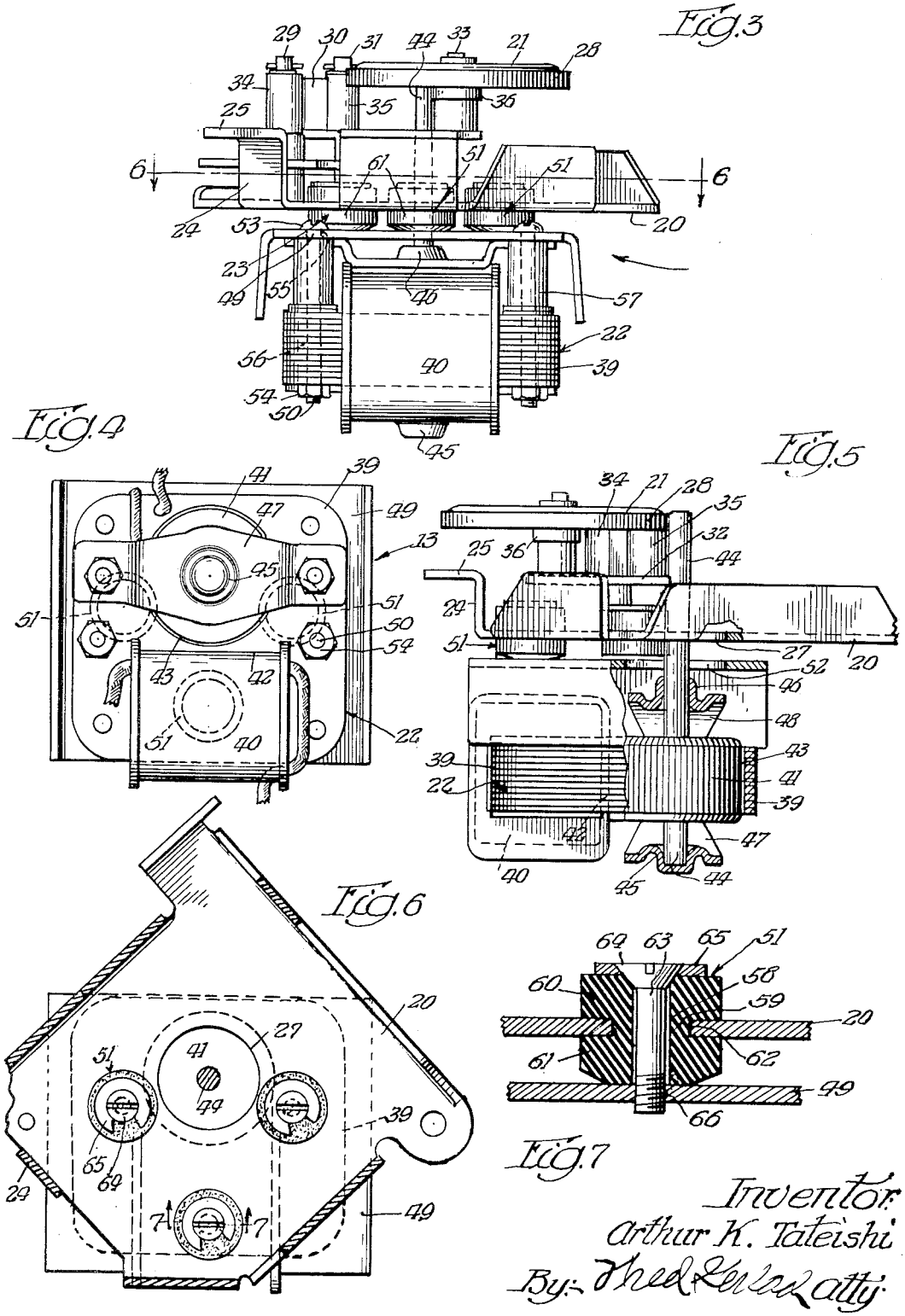

United States Patent Office 2,732,724
Patented Jan. 31, 1956

2,732,724

PHONOGRAPH WITH RESILIENT MOUNT FOR TURNTABLE DRIVING ELECTRIC MOTOR

Arthur K. Tateishi, Toronto, Ontario, Canada, assignor to Audio Tool and Engineering Limited, Toronto, Ontario, Canada Application October 18, 1952, Serial No. 315,515

1 Claim. (Cl. 74—206)

The present invention relates generally to phonographs. More particularly the invention relates to that type of phonograph which serves to reproduce sound from a disc-type record and as its principal components comprises: (1) a stamped metal base plate which extends horizontally and has a small sized cutout therein; (2) a record supporting turntable which embodies a depending annular flange on its outer margin and is positioned over the base plate and so that a portion thereof overlies the cutout; (3) a needle carrying tone arm which is connected to one corner portion of the base plate so that it is capable of swinging horizontally back and forth over the turntable; (4) a stamped metal mounting plate which is disposed a small distance beneath the cutout in the base plate and is fixedly connected to the base plate; (5) a comparatively large horizontally disposed idler wheel which is disposed directly above the cutout, has supporting means between it and the mounting plate and is arranged so that a portion of its periphery is normally in frictional engagement with a portion of the inner periphery of the depending annular flange on the outer margin of the turntable; (6) a two pole single speed electric motor which is disposed beneath, and connected to, the mounting plate and embodies a rectangular horizontally positioned laminated stator with a transverse slot at one end thereof and a circular hole in its other end, a field coil around the portion of the one end of the stator that is outwards of the slot, and an armature in the circular hole at the other end of the laminated stator; and (7) a vertical armature shaft which has the lower portion thereof extending through, and fixedly connected to, the central portion of the armature and its upper end in engagement with another peripheral portion of the idler wheel and is adapted in connection with operation of the motor to drive the turntable through the medium of the idler wheel.

In a phonograph of the aforementioned type it has been found that if the two pole single speed motor is connected fixedly to the mounting plate so-called rumble occurs due to motor vibration resulting from off balance of the armature and its shaft or normal cycle variations or fluctuations.

One object of the invention is to provide a phonograph which is an improvement upon, and has certain advantages over, previously designed phonographs and is characterized by the fact that it embodies a particular resilient mount whereby the two pole single speed electric motor is so supported with respect to the mounting plate that rumble producing vibration is reduced to a minimum.

Another object of the invention is to provide a phonograph of the type under consideration in which the resilient mount between the motor and the mounting plate consists of three rubber members which are arranged in the form of a triangle and are so positioned that when the motor vibrates due to off balance of the armature or normal cycle variations or fluctuations the armature shaft moves tangentially with respect to the portion of the idler wheel that is engaged by the upper end of the shaft and hence does not cause the idler wheel to bind with respect to the depending annular flange on the outer margin of the turntable.

A further object of the invention is to provide a phonograph which is generally of new and improved construction and, due to its particular resilient mount for the electric motor, is highly efficient in operation and smooth running.

Other objects of the invention and the various advantages and characteristics of the present phonograph will be apparent from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 3 is an enlarged vertical section taken on the line 3—3 of Figure 1 and illustrating in detail the construction or design of the assembly of mounting plate, idler wheel and electric motor;

Figure 4 is a bottom view of the electric motor;

Figure 5 is an enlarged vertical section taken on the line 5—5 of Figure 1, certain parts being shown broken away and other parts being shown in section for illustrative purposes;

Figure 6 is a horizontal section on the line 6—6 of Figure 3; and

Figure 7 is an enlarged section taken on the line 7—7 of Figure 6 and illustrating in detail the construction and manner of mounting of one of the three rubber members for resiliently connecting the motor to the mounting plate.

Figure 1:
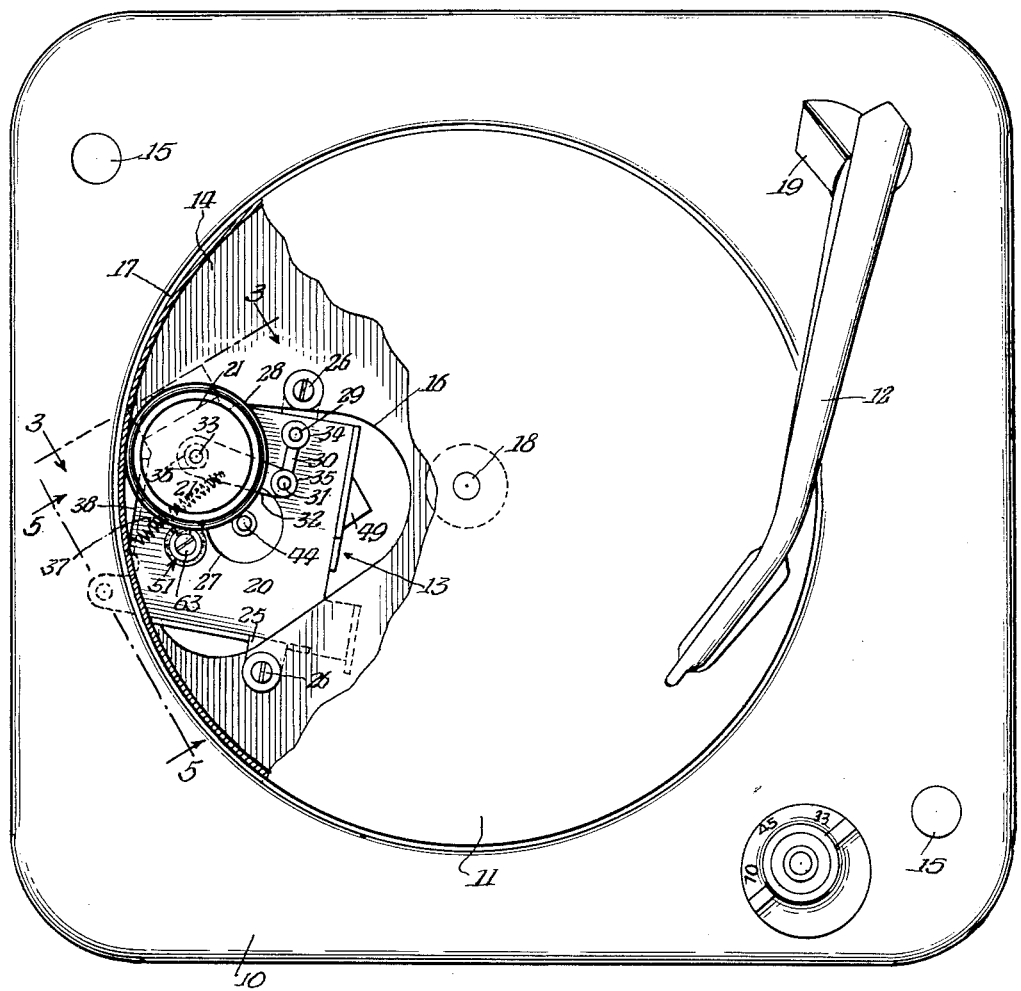
Figure 1 is a plan view of a phonograph embodying the invention, certain parts being broken away and other parts being shown in section for purposes of illustration.
Figure 2:
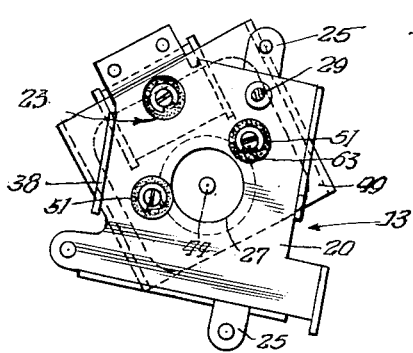
Figure 2 is a horizontal section taken on a plane directly beneath the base plate of the phonograph and illustrating the arrangement and location of the three rubber members that constitute the resilient mount between the electric motor and the mounting plate.

The phonograph which is shown in the drawings constitutes the preferred form or embodiment of the invention. It is adapted to reproduce sound from disc type records and comprises a horizontally extending substantially rectangular base plate 10, a turntable 11, a tone arm 12 and in addition a unitary assembly 13 which, as hereinafter pointed out in detail, serves to drive the turntable. The various parts of the phonograph with the exception of the turntable driving assembly are conventional or standard. The base plate 10 is in the form of a one-piece sheet metal stamping and has in its central portion a depressed circular part 14 which is of slightly greater diameter than the turntable 11. The corner portions of the base plate 10 are provided with depending spiral spring legs 15 for resiliently supporting the base plate in an elevated position on the housing structure (not shown) for the phonograph. The left hand portion of the depressed circular part 14 as viewed in Figure 1, is provided with a sector shaped cutout 16. The turntable 11 is located for the most part within the depressed part 14 of the base plate and embodies on its central portion a depending hub (not shown) and on its outer marginal portion a depending annular flange 17. The aforementioned hub on the central portion of the turntable surrounds the base part of an upstanding spindle 18 and serves to support the turntable rotatably. The depending annular flange 17 extends at right angles to the turntable and provides on its inner periphery a friction type driving surface. The spindle 18 is adapted to support a stack of records in elevated and centered relation with the turntable and has associated with it conventional ejector mechanism (not shown) for automatically permitting the lowermost record of the stack to drop toward the turntable after playing of a previously dropped record on the turntable. The tone arm 12 is disposed above the turntable and has one end thereof connected to a pedestal 19 on one corner of the base plate 10 so that it is capable of swinging laterally relatively to the turntable. The distal or outer end of the tone arm is provided with a depending needle (not shown) for engaging the sound track of the record to be played.

The unitary assembly 13 is located under the outer portion of the turntable 11 and comprises a mounting plate 20, a laterally movable idler wheel 21, an electric motor 22 and a resilient mount 23 between the motor and the mounting plate.

The mounting plate 20 of the assembly is in the form of a one-piece sheet metal stamping and is substantially square. It extends horizontally and is disposed a small distance beneath the cutout 16 in the depressed part 14 of the base plate 10. Along certain of its marginal portions the mounting plate 20 is provided with integral upwardly extending flanges 24, the upper ends of which are bent outward to form horizontal ears 25. The latter abut against the superjacent portions of the depressed part 14 of the base plate 10 and are secured in place by way of vertically extending screws 26 which extend downwards through holes in said superjacent portions of the depressed part 14 into threaded holes in the ears 25. The central portion of the mounting plate 20 is provided with a large sized hole 27.

The idler wheel 21 of the unitary assembly 13 extends horizontally and is disposed directly beneath the turntable 11. It is located a small distance above the mounting plate 20 and is horizontally aligned with the depending flange 17 on the outer margin of the turntable. The rim portion of the idler wheel is provided with a circumferential groove in which is seated a tire-like tread member 28 of rubber or like material having a high coefficient of friction. As best shown in Figure 1, the idler wheel is supported so that it is movable laterally into and out of an operative position wherein a portion of its tread member is in frictional engagement with the inner periphery of the depending annular flange 17. The means whereby the idler wheel is supported comprises a vertically extending post 29, a horizontally extending link 30, a vertically extending pin 31, a horizontally extending arm 32, and a vertically extending spindle 33. The vertically extending post 29 is located inwards of the idler wheel 21 and has its lower end connected by a rivet or other suitable attaching device to the subjacent portion of the mounting plate 20. The link 30 extends substantially tangentially of the inner portion of the idler wheel and is provided at one end thereof with a vertically extending tubular member 34 which extends loosely around the upper end of the post 29. The other end of the link is provided with a vertically extending tubular member 35. The vertically extending pin 31 extends through, and is rotatably mounted in the tubular member 35 and is suitably held against axial displacement with respect to the link 30. The horizontally extending arm 32 is disposed beneath and extends radially with respect to the idler wheel 21 and has one end thereof connected fixedly to the lower end of the pin. The spindle 33 extends upwards with respect to the arm 32 and has its lower end connected fixedly to the other end of the arm. The idler wheel 21 is provided with a hub 36 and this extends around and is rotatable with respect to the upper portion of the spindle 33. A spiral tension spring 37 serves yieldingly to urge the idler wheel into its operative position wherein a portion of its tread member engages the inner periphery of the depending flange 17 on the outer margin of the turntable. One end of the spring 37 is connected to an upwardly extending flange 38 on one side margin of the mounting plate 20 and the other end of the spring is connected to the end of the arm 32 to which the spindle 33 is connected.

The electric motor 22 is disposed beneath the mounting plate 20 and is of the two pole single speed variety. It serves as the medium for driving the turntable 11 of the phonograph and comprises a rectangular laminated stator 39, a field coil 40 and an armature 41. The laminated stator 39 of the motor extends horizontally and has a transverse slot 42 in one end thereof and a vertically extending circular hole 43 in its other end. The field coil 40 extends around the portion of the one end of the stator that is outwards of the slot 42 and has suitable leads (not shown) for connecting it to a source of electric current. The armature 41 is disposed within the circular hole 43 in the other end of the laminated stator and is adapted to rotate about a vertical axis. The stator is so positioned or located that the field coil 40 is located under the idler wheel 21 and the circular hole 43 in which the armature 41 is mounted is disposed in concentric relation with the circular hole 27 in the central portion of the mounting plate 20. In addition to the parts heretofore mentioned the motor 22 of the phonograph comprises a vertically extending armature shaft 44 whereby the armature is rotatably supported. The lower portion of the armature shaft extends centrally through, and is fixedly connected to, the armature. The lower end of the armature shaft is journalled in a bearing 45 and the central portion of the shaft is journalled in a bearing 46. The bearing 45 underlies the laminated stator 39 and is secured thereto by a U-shaped bracket 47 and the bearing 46 overlies the stator and is connected thereto by an inverted U-shaped bracket 48. The upper end portion of the armature shaft 44 extends centrally through the circular hole 27 in the central portion of the mounting plate 20 and the upper extremity of the shaft is so arranged that it engages the inner portion of the tread member 28 of the idler wheel 21 when the idler wheel is in its operative position. When the motor 22 is energized as the result of supply of electric current to the field coil 40 the vertically extending shaft 44, in response to rotation of the armature, effects drive of the turntable 11 through the medium of the idler wheel 21.

The resilient mount 23 comprises a flat rectangular horizontally extending plate 49, a pair of vertically extending screws 50 and three grommet-like members 51. The plate 49 of the resilient mount is disposed a small distance beneath the mounting plate 20 and overlies the two pole single speed electric motor 22. It is positioned in substantially registering relation with the rectangular laminated stator 39 of the motor and has in one end portion thereof a circular hole 52 which is the same in diameter as, and is coaxially arranged with respect to, the hole 27 in the central portion of the mounting plate 20. The central portion of the armature shaft 44 extends centrally through the hole 52. The vertically extending screws 50 of the resilient mount 23 are spaced laterally apart and have integral kerf-equipped heads 53 at their upper ends and clamp nuts 54 on their lower ends. The portions of the screws that are directly beneath the heads 53 extend through holes 55 in the central portions of the side parts of the plate 49. The heads 53 overlie the portions of the plate 49 that define the holes 55 and coact therewith to prevent downward displacement of the screws with respect to the plate. The lower portions of the screws extend through vertical holes 56 in the central portions of the side parts of the laminated stator 39 and the upper portions of the screws are provided with tubular spacer members 57 which serve to hold the motor in spaced relation with respect to the plate 49. The nuts 54 on the lower ends of the screws 50 bear against the bottom surface of the laminated stator 39 and serve to clamp the stator against the lower ends of the tubular spacer members 57. The screws 50 and the tubular spacer members 57 serve to hold the motor in fixedly connected relation with the plate 49. The three grommet-like members 51 are formed of rubber or like resilient material. They have formed in their central portions vertically extending cylindrical holes 58 and consist of reduced central ports 59, enlarged upper end parts 60 and enlarged lower end parts 61. The reduced central parts 59 fit within circular holes 62 in the mounting plate 20 and the enlarged upper and lower end parts 60 and 61 of the grommet-like members 51 are arranged in straddled relation with the portions of the mounting plate that define the holes 62, as shown in Figure 7. The top surface of the plate 49 of the resilient mount 23 abuts against the bottom surfaces of the enlarged lower end parts 61. Vertical screws 63 extend loosely through the holes 58 in the grommet-like members and serve to clamp the plate 49 against the bottom surfaces of the enlarged lower end parts 61. Such screws have on the upper ends thereof kerf-equipped heads 64 which, as shown in Figure 7, are surrounded by washers 65. The latter bear against the top surfaces of the enlarged upper end parts 60 of the grommet-like members 51. The lower ends of the screws fit within screw threaded holes 66 in the subjacent portions of the plate 49. The grommet-like members 51 and the screws 63 serve to hold the plate 49 in resiliently connected relation with the mounting plate 20. Due to the construction of the grommet-like members the plate 49 together with the motor 22 is permitted to move laterally to a limited extent relatively to the mouning plate. The three grommet-like members are arranged in the form of an equilateral triangle. One of the members is located over the field coil 40 of the electric motor 22 and the other two members are located over the central portions of the side parts of the laminated stator, as shown in Figures 5 and 6. The center of the equilateral triangle in which the the three grommet-like members 51 are disposed lies in an imaginary vertical line which extends through the center of mass of the motor. As a result of this the grommet-like members 51 so resiliently support the motor that in connection with vibration due to off balance of the armature and its shaft or normal cycle variation or fluctuations the motor tends to rock or rotate horizontally back and forth about its center of mass. The armature shaft 44 is located at a substantial distance from the center of mass of the motor and is so positioned with respect to the idler wheel that when the motor rocks or rotates horizontally about its center of mass in connection with vibration the upper end of the armature shaft moves or swings tangentially with respect to the portion of the tread member 28 which is engaged by it. By having the upper end of the armature shaft in connection with motor vibration move tangentially with respect to the portion of the idler wheel tread member that is engaged by it so-called rumble is reduced to a minimum and there is no likelihood of the upper end of the armature shaft causing the idler wheel to bind with respect to the depending flange on the outer margin of the turntable.

The herein described phonograph, due to the particular resilient mount for the two pole single speed electric motor is highly efficient in operation and runs smoothly.

The invention is not to be understood as restricted to the details set forth since these may be modified within the scope of the appended claim without departing from the spirit and scope of the invention.

Having thus described the invention what I claim as new and desire to secure by Letters Patent is:

In a phonograph of the type that embodies a horizontally disposed turntable with a depending annular flange on its outer margin; a unitary assembly operative to drive the turntable and comprising: a stationary horizontally extending mounting plate disposed a small distance beneath the turn table and provided with a hole therethrough; a horizontal idler wheel disposed above, and supported by, the mounting plate and arranged so that a portion of its periphery engages the inner periphery of the turntable flange; a two pole single speed electric motor positioned a small distance beneath the mounting plate and consisting of a rectangular horizontally extending laminated stator having a vertical hole in a portion thereof that is laterally offset an appreciable distance from the center of mass of the motor as a whole, a field coil mounted on a different portion of the stator, and a rotatable armature positioned in the last mentioned hole and provided with a fixed vertically extending armature shaft, the upper end of which extends through the hole in the mounting plate, is positioned in engagement with another portion of the periphery of the idler wheel and is adapted in connection with motor operation to drive said idler wheel for turntable driving purposes; and a resilient mount between the motor and the mounting plate, said resilient mount and motor being so arranged that in the event of vibration of the motor said upper end of the armature shaft is caused to move back and forth only substantially tangentially with respect to said another portion of the periphery of the idler wheel, said mount comprising a horizontal plate disposed directly over, and connected fixedly to, the stator of the motor and spaced a small distance beneath the mounting plate, and a plurality of laterally spaced resilient members disposed between and connected to the mounting plate and the second mentioned plate, said resilient members being three in number and arranged to form an equilateral triangle, the center of which lies in an imaginary vertical line extending through said center of mass of the motor, the armature of said motor being so positioned that its armature shaft is disposed directly adjacent to the central portion of one side of said equilateral triangle.

References Cited in the file of this patent

UNITED STATES PATENTS

| | | |
|---|---|---|
| 2,455,280 | Sweighert | Nov. 30, 1948 |
| 2,530,820 | Hoehn et al. | Nov. 21, 1950 |
| 2,603,977 | Cain | July 22, 1952 |
| 2,621,527 | Guest et al. | Dec. 16, 1952 |